United States Patent
De Ginto et al.

(10) Patent No.: US 7,537,358 B2
(45) Date of Patent: May 26, 2009

(54) METHOD AND APPARATUS FOR REPELLING PESTS

(76) Inventors: Michael Joseph De Ginto, P.O. Box 1147, 1499-1 Sumneytown Pike, Kulpsville, PA (US) 19443; William Lester Earl, 637 Noble St., Norristown, PA (US) 19401

( * ) Notice: Subject to any disclaimer, the term of this patent is extended or adjusted under 35 U.S.C. 154(b) by 0 days.

(21) Appl. No.: 11/287,650

(22) Filed: Nov. 28, 2005

(65) Prior Publication Data
US 2006/0077663 A1    Apr. 13, 2006

Related U.S. Application Data

(63) Continuation-in-part of application No. 10/936,385, filed on Sep. 8, 2004, now abandoned.

(51) Int. Cl.
*F21V 23/04* (2006.01)
(52) U.S. Cl. .................... 362/276; 362/394
(58) Field of Classification Search ........... 362/276, 362/802, 394, 233
See application file for complete search history.

(56) References Cited

U.S. PATENT DOCUMENTS

| | | | |
|---|---|---|---|
| 3,517,226 A | 6/1970 | Jones et al. | 310/8.5 |
| 4,658,386 A | 4/1987 | Morris | 367/139 |
| 4,689,776 A | 8/1987 | Thorndyke et al. | 367/139 |
| 4,805,077 A * | 2/1989 | Sikora | 362/267 |
| 5,015,994 A | 5/1991 | Hoberman et al. | 340/567 |
| 5,214,411 A | 5/1993 | Herbruck | 340/573 |
| 5,463,595 A | 10/1995 | Rodhall et al. | 367/93 |
| 5,570,655 A | 11/1996 | Targa | 119/51.02 |
| 5,825,280 A * | 10/1998 | Merendini et al. | 340/326 |
| 6,134,184 A | 10/2000 | Waletzky et al. | 367/139 |
| 6,443,604 B1 * | 9/2002 | Rudenberg | 362/488 |
| 6,710,705 B1 | 3/2004 | Smith et al. | 340/384.2 |
| 6,856,243 B2 | 2/2005 | Smith et al. | 340/384.2 |
| 2003/0193805 A1 * | 10/2003 | Matheson et al. | 362/276 |

* cited by examiner

*Primary Examiner*—Jong-Suk (James) Lee
*Assistant Examiner*—Julie A Shallenberger
(74) *Attorney, Agent, or Firm*—Kunzler & McKenzie

(57) ABSTRACT

A method and apparatus are disclosed for preventing pests sensitive to light from inhabiting an enclosed area. In one embodiment, the method includes providing a strobe light configured to emit high intensity flashes of light in a continuously repeated pattern, a mounting mechanism configured to mount the strobe light in the enclosed area, and a power source configured to supply energy to the strobe light; placing the strobe light in the enclosed area in a relatively central location; providing power to the strobe light; and driving pests sensitive to light from the enclosed area.

8 Claims, 6 Drawing Sheets

METHOD AND APPARATUS FOR REPELLING PESTS

CROSS-REFERENCES TO RELATED APPLICATIONS

This application is a continuation-in-part of and claims priority to U.S. patent application Ser. No. 10/936,385 entitled "HIGH INTENSITY STROBE LIGHT BEAM RODENT REPELLING APPARATUS" and filed on Sep. 8, 2004, now abandoned, for Michael Joseph De Ginto and William Lester Earl, which is incorporated herein by reference.

BACKGROUND OF THE INVENTION

1. Field of the Invention

This invention relates to pest deterrents and more particularly relates to methods and apparatuses for preventing pests sensitive to light from inhabiting an enclosed area.

2. Description of the Related Art

Animals that cause problems or are a nuisance to humankind are commonly known as pests. Property owners often report being plagued by rodents, such as squirrels, rats, mice, bats, raccoons, and the like, which frequently inhabit enclosed areas of homes, barns, garages, cellars, and other building structures. Insects, such as cockroaches, spiders, scorpions, bees, ants, etc., are another type of pest that typically plague humankind and can cause physical harm in certain instances.

Rodents and other pests inherently deposit urine and feces, which can be a vehicle for spreading disease, and often cause damage to surrounding property. Squirrels, in particular, are known to remove insulation, chew wires, and even cause electrical fires. The cost of repairs due to damage caused by rodents can be exorbitant.

Attempts have been made in the past to remove rodents, insects, and other pests from enclosed areas, such as attics and crawl spaces. A common method to repel pests includes using strong chemicals, natural odors, or sticky substances to irritate the pest. Odors and/or chemicals, however, typically are ineffective deterrents unless the pest is killed as a result of exposure. Killing pests generally implies leaving behind a corpse, which may pose a danger to humans and may negatively affect the environment.

Additionally, chemicals tend to be expensive, particularly if professional exterminators are required to eliminate the pests. Exterminators and chemical deterrents typically become a recurring expense for property owners. In addition, the chemicals themselves may create possible hazards to the users.

Another common method of repelling rodents or other pests employs ultrasonic sound to ward off the animals. This method, however, does not affect some pests, which either build up a tolerance to the noise or continue existing just out of range of the sound. Squirrels, in particular, have been known to form sound barriers with roofing insulation in order to continue living in their chosen abode. Once the ultrasonic sound ceases, the rodents tend to quickly re-inhabit the enclosed area, indicating that the ultrasonic sounds usually do not produce a lasting effect.

Mechanisms that generate ultrasonic sounds commonly require power either from batteries or electrical outlets. Batteries must be replaced frequently to sustain production of the ultrasonic sound, while ultrasonic units requiring power outlets must be strategically installed in several specific locations in order to maximize the units' effectiveness to repel pests. This tends to be an expensive and somewhat ineffective solution.

From the foregoing discussion, it should be apparent that a need exists for an apparatus and method that repel pests inhabiting enclosed areas. Beneficially, such an apparatus and method would provide an economical, long-lasting solution to prevent pest infestations without permanently injuring the animals. The apparatus and method would be simple to install, would cover a large extended area, and would be energy efficient compared to other solutions.

SUMMARY OF THE INVENTION

The present invention has been developed in response to the present state of the art, and in particular, in response to the problems and needs in the art that have not yet been fully solved by currently available pest deterrents. Accordingly, the present invention has been developed to provide a method and apparatus for repelling pests that overcome many or all of the above-discussed shortcomings in the art.

A method of the present invention is presented for preventing pests sensitive to light from inhabiting an enclosed area. In one embodiment, the method includes providing a strobe light configured to emit high intensity flashes of light in a continuously repeated pattern, a mounting mechanism configured to mount the strobe light in the enclosed area, and a power source configured to supply energy to the strobe light; placing the strobe light in the enclosed area in a relatively central location; providing power to the strobe light; and driving pests sensitive to light from the enclosed area.

In certain embodiments, the method may further include hanging the strobe light from a support of the enclosed area. Placing the strobe light in a relatively central location may facilitate dispersing the high intensity flashes of light throughout the enclosed area. In a further embodiment, the method may include continuously repeating the pattern of flashes at a relatively high frequency to provide a potent, continuous pest deterrent. The pattern may be repeated continuously for an extended period of time.

In addition, eliminating extraneous sources of light within the enclosed area may increase the effectiveness of the strobe light. In certain embodiments, the power supplied to the strobe light may be regulated to provide an energy-efficient solution for repelling pests as well as a safety mechanism to prevent accidents.

The apparatus, in one embodiment, includes a strobe light that emits high intensity flashes of light in a continuously repeated pattern, a mounting mechanism configured to mount the strobe light in the enclosed area at a relatively central location, and a power source configured to supply power to the strobe light. The apparatus may further include a timer to monitor the power supplied to the strobe light, a motion sensor to trigger the power supplied to the strobe light, and/or a switch to manually regulate the power supplied to the strobe light. In certain embodiments, the apparatus may further include a remote switch to control the power supply remotely.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an economical, long-lasting solution to pest control without permanently injuring the animals. The apparatus is simple to install, protects a large extended area, and is energy efficient. The present invention operates in relative silence and does not require harmful chemicals or odors to ward off pests. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. Additionally, the order in which a particular method occurs may or may not strictly adhere to the order of the corresponding steps shown.

Figure 1:
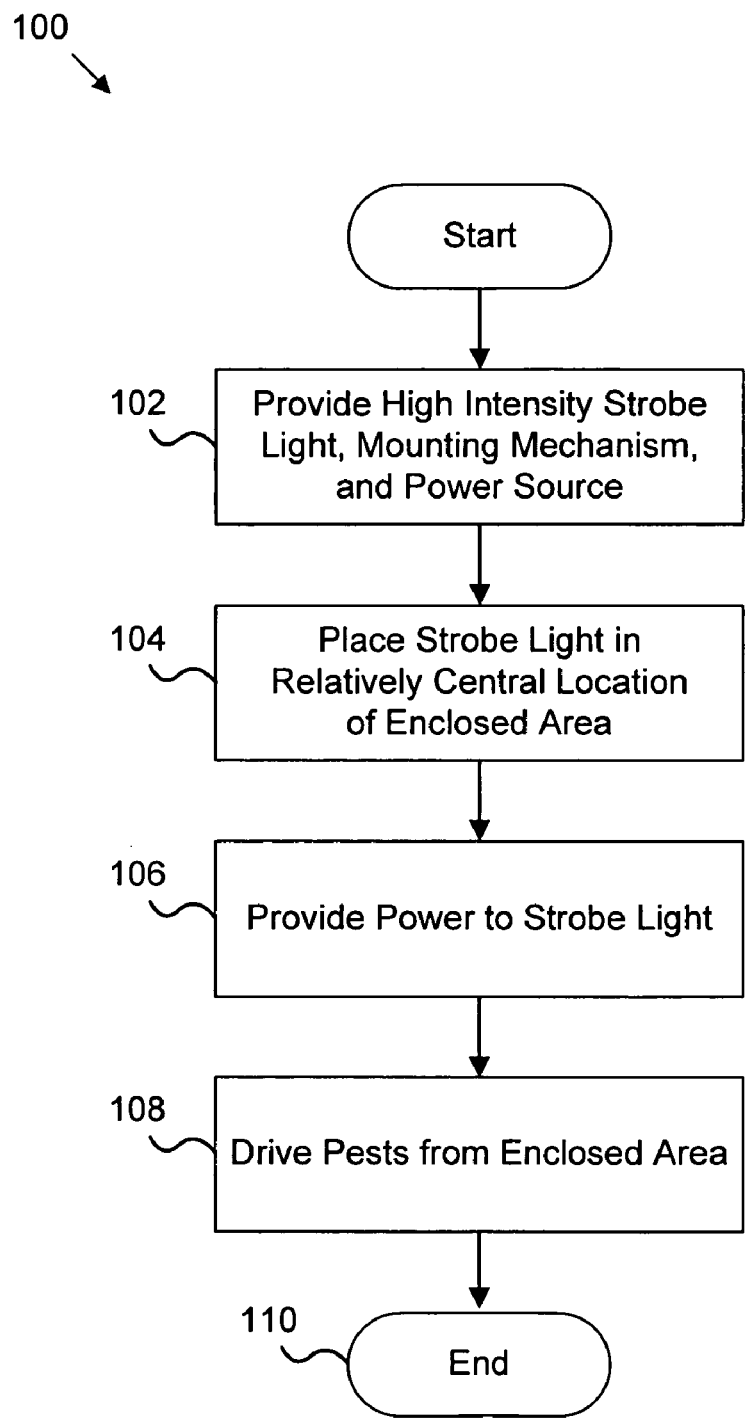
FIG. 1 is a schematic flow chart diagram illustrating one embodiment of a pest deterrent method in accordance with the present invention.

FIG. 1 depicts one embodiment of a method 100 for repelling pests. The method 100, as depicted, includes providing 102 a high intensity strobe light with a mounting mechanism and a power source, placing 104 the strobe light in a relatively central location within an enclosed area, providing 106 power to the strobe light, and driving 108 pests from the enclosed area. The method 100 ends 110.

Flashing a high intensity light in a continuously repeated pattern may facilitate disrupting the living pattern of pests inhabiting an enclosed area, which consequently provokes the pests to abandon the enclosed area. Pests that are sensitive to light, such as rodents, birds, insects, mammals, reptiles, etc., may be driven 108 easily and economically from the enclosed area without permanently harming the pests. The method 100 is preferably employed in an unoccupied, enclosed area.

The high intensity strobe light repels unwelcome animals without additional scents, ultrasonic sounds, chemicals, sirens, traps, or the like. The high intensity flashes aggravate the pest's acute optical senses, creating stress significant enough to motivate the animal(s) to vacate 108 the enclosed area. Furthermore, the potent negative stimulation typically prevents the animals from reentering the enclosed area, even when the strobe light is no longer powered 106. Thus the method 100 may provide a simple, yet relatively permanent solution for pest control.

In one embodiment, the method 100 may be used to repel pests, such as squirrels and roof rats, which are known to inhabit crawl spaces and attics of homes and buildings. The continuous high intensity flashes of light effectively and consistently annoy the rodents and force them to find a new habitat. The rodents may even be known to communicate to other rodents to avoid the affected enclosed area.

In certain embodiments, the pests have been known to vacate the enclosed area within twenty-four hours or less of providing 106 power to the high intensity strobe light, the majority of the pests leaving immediately. Observation suggest that even if the high intensity strobe light is positioned in an enclosed area often frequented by rodents, the rodents typically become annoyed and relocate any nests close to the enclosed area.

Further experimentation suggests that light sensitive insects, such as cockroaches, spiders, scorpions, bees, ants, and the like, are affected by the high intensity strobe light. Continuous exposure to the high intensity flashes drives the insects away.

The method 100 may be effectively employed in any enclosed area to repel 106 pests. In a contemplated embodiment, the method 100 may be applied in storage rooms/units, food storage bins, restaurants, warehouses, attic and basement crawl spaces, sheds, kitchens, and the like. Anywhere light-sensitive pests pose a threat the high intensity strobe light may be used to ward off the pests. The device and method may also be used in open areas to control pests such as bears and deer.

In one embodiment, the high intensity strobe light may be placed 104 or installed in a newly constructed building, storage unit, or the like to prevent pests from entering or inhabiting selected enclosed areas. In certain embodiments, the strobe light may be wired to turn on with a light switch, similar to overhead lights. The preventative measure may ensure against pest infestations and may protect a building from structural damage and from the spread of disease. In addition, installing a high intensity strobe light in cabinet space, a food storage area, or the like may prevent insect infestations. Preferably, the high intensity strobe light is installed with caution to prevent negative affects to humans, pets, or other non-targeted animals.

Figure 2:
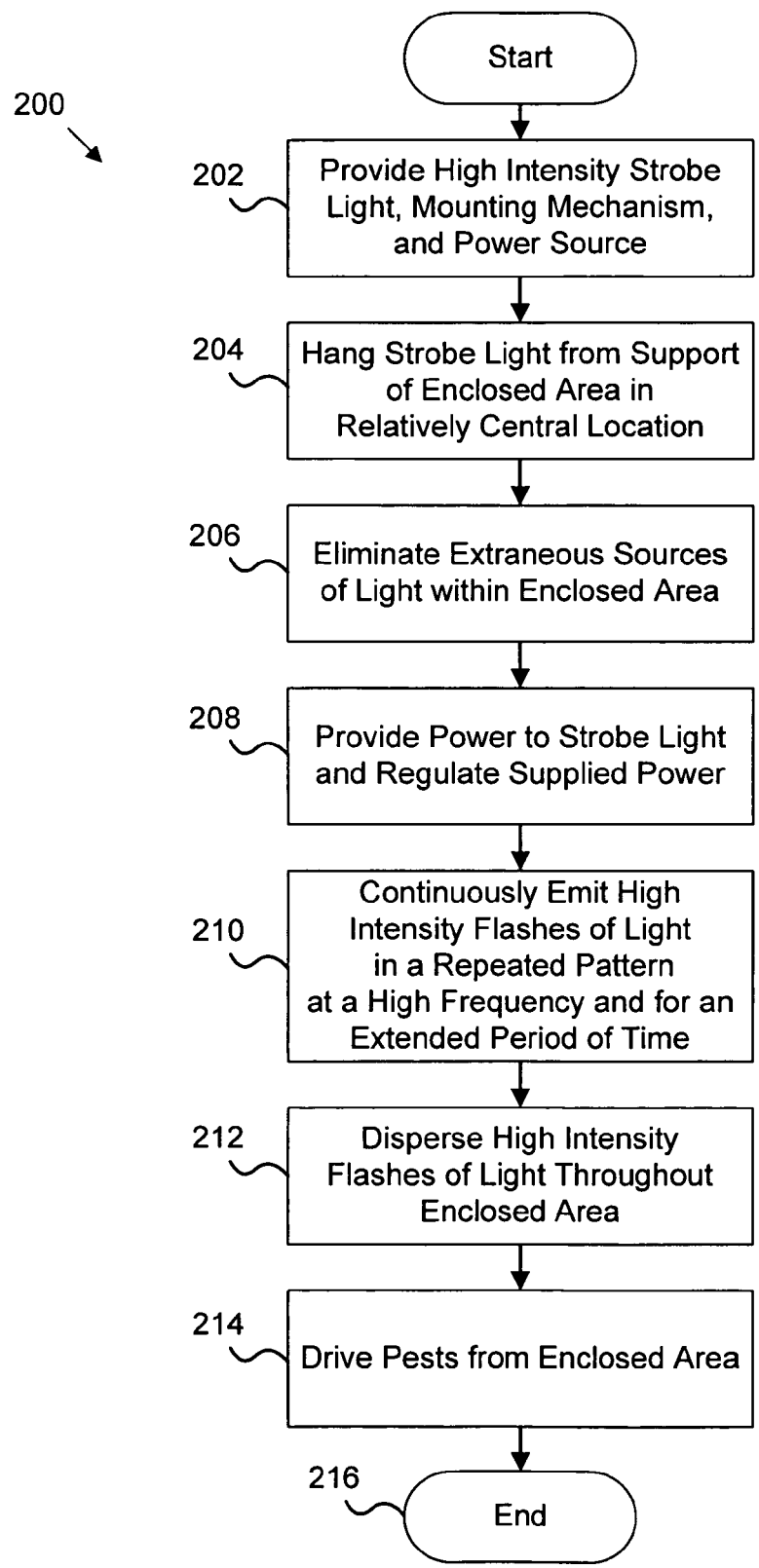
FIG. 2 is a schematic flow chart diagram illustrating an alternative embodiment of a pest deterrent method in accordance with the present invention.

FIG. 2 illustrates another embodiment of a method 200 for repelling pests in accordance with the present invention. The method 200, as illustrated, includes providing 202 a high intensity strobe light with a mounting mechanism and power source, hanging 204 the strobe light from a support of the enclosed area in a relatively central location, eliminating 206 extraneous sources of light within the enclosed area, providing 208 power to the strobe light and regulating the supplied power, continuously emitting 210 high intensity flashes of light in a repeated pattern at a high frequency and for an extended period of time, dispersing 212 high intensity flashes of light throughout the enclosed area, and driving 214 pests from the enclosed area. Subsequently, the method 200 ends 216.

Figure 3:
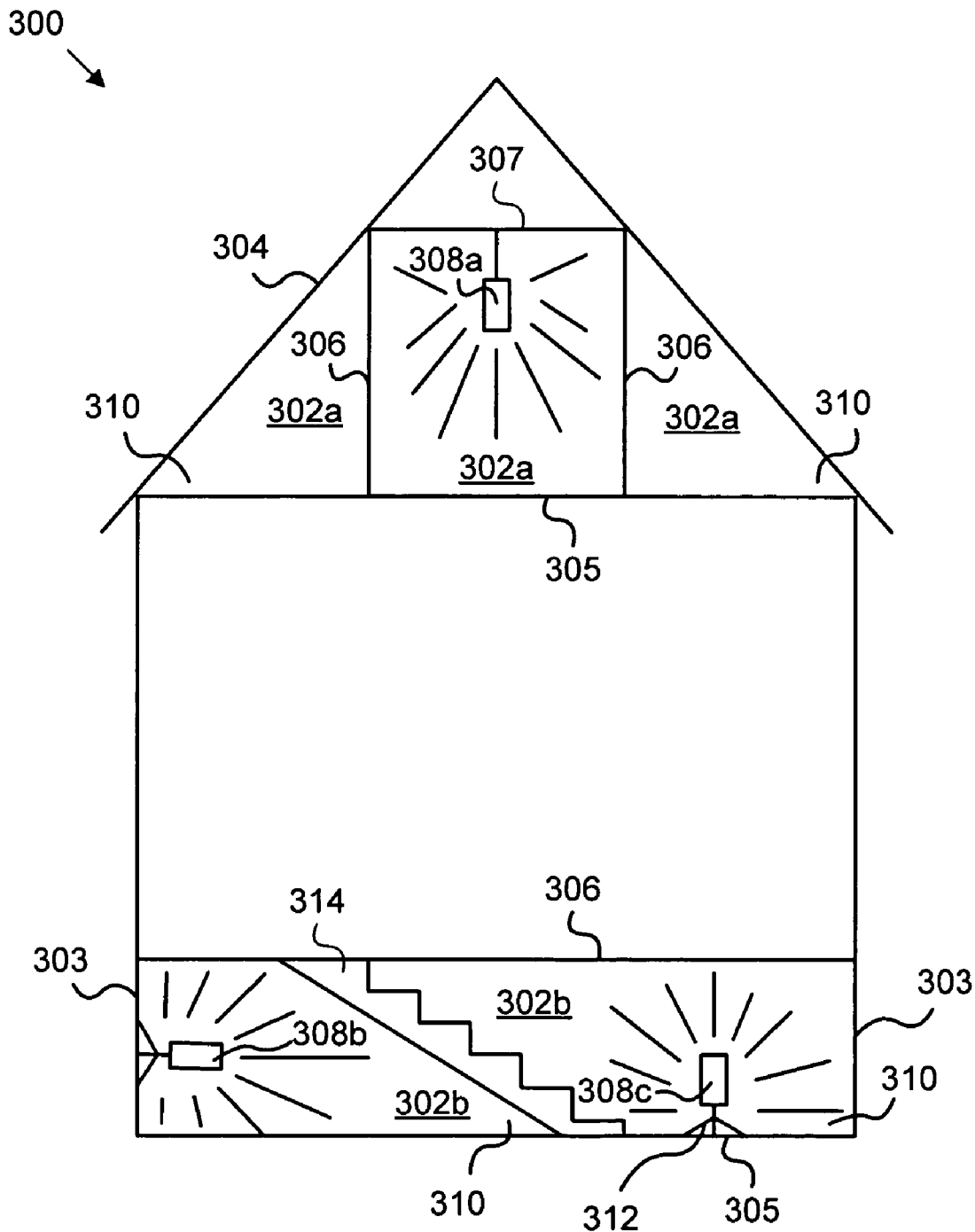
FIG. 3 is a cross-sectional view illustrating one embodiment of an enclosed area containing a centrally mounted strobe light in accordance with the present invention.

The enclosed area may be similar to the enclosed area illustrated in FIG. 3 in certain embodiments. The method 200 may be discussed in relation with FIG. 3; however, the method 200 is not limited to the illustrated embodiments.

FIG. 3 illustrates one embodiment of a building 300 with a plurality of enclosed areas 302, such as an attic crawl space 302a and a basement crawl space 302b, which may or may not be infested with pests. As mentioned above, the enclosed area 302 may be protected with a strobe light in order to prevent pest infestation.

The enclosed area 302 may be any defined area that is substantially enclosed by walls 303, a roof 304, floor 305, ceiling 306, or the like. In certain embodiments, the enclosed area 302 typically represents a dark, secluded area where pests naturally feel comfortable to nest or frequent, which is generally a place unoccupied by humans. The enclosed area 302 may comprise one or more supports 307, such as a support beam 307, wall 303, ceiling 306, or the like.

A high intensity strobe light 308 may be provided 202 to disperse 212 high intensity flashes of light throughout the enclosed area 302. In certain embodiments, the high intensity strobe light 308 comprises a beacon that emits light on all sides of the strobe light 308.

In one embodiment, the strobe light 308 is a high intensity strobe light manufactured by Federal Signal Corporation, 2645 Federal Signal Drive, University Park, Ill., 60466. Federal Signal Corporation provides a plurality of high intensity strobe lights 308, such as the LP3M-C120C strobe light and the Firebolt FB2ST-120C, which are powered by twelve watts and emit a high intensity flash of light having the strength of 100,000 candlelight power or more, which may provide adequate stimulation to ward off pests without producing excessive heat. In one embodiment, the strobe light 308 produces a flash of light having one million candlelight power. In certain embodiments, given by way of example, the strobe light 308, or strobe tube, produces continuous flashes of light for 7,000-10,000 hours.

As mentioned, the strobe light 308a may be mounted or hung 204 from the support 307 or the like in order to place the strobe light 308 in a relatively central location. The central location enables the high intensity flashes of light to be dispersed 212 throughout the enclosed area 302, reaching the corners 310 and recesses of the enclosed area 302. In certain embodiments, the central location may be relative to a known nest, to a wall 303, floor 305, or ceiling 306, or to the overall enclosed area 302. Ultimately, the strobe light 308 may be placed in a relatively central location where the high intensity flashes of light will have the greatest effect for repelling the pest(s).

In one embodiment, the strobe light 308b comprises a mounting mechanism for mounting the strobe light 308b on a wall 303. In another embodiment, the strobe light 308c includes a mounting mechanism such as a stand 312 for centrally placing the strobe light 308c relative to the floor 305. Those of skill in the art will recognize that a variety of mounting mechanisms may be used to mount or place the strobe light 308 in the enclosed area in a relatively central location.

In one embodiment, given by way of example, the strobe light 308 affects an area of about 30 feet×30 feet, depending on the placement of the strobe light 308. In certain embodiments, multiple strobe lights 308 strategically spaced maybe required, such as strobe lights 308b and 308c shown in the enclosed area 302b, in order to provide adequate coverage. Particularly if an enclosed area 302 is extremely large or contains multiple light obstructions, such as stairs 314 in the depicted embodiment, multiple strobe lights 308 may provide a more powerful deterrent for pests.

The method 200 of the present invention may require an enclosed area 302 to intensify the effects of the strobe light and to prevent the strobe light from negatively affecting people, animals, or the like, outside of the enclose area 302. In addition and as a result, the pests may choose to escape the enclosed area to an unaffected area physically unharmed. Beneficially, the user may be freed from releasing pests from traps or from disposing of rotting carcasses.

In certain embodiments, the user may be required to eliminate 206 or block extraneous light sources by covering windows, turning off lights, closing doors, or the like. Accordingly, if the enclosed area is devoid of light, the effects of the high intensity strobe light may be greater.

The power supplied 208 to the strobe light 308 may be regulated by one or more mechanisms. In certain embodiments, the power source may be coupled to a timer, a motion sensor, and/or a switch, which will be discussed in greater detail with relation to FIG. 4. In addition, the power may be controlled remotely in certain embodiments.

Typically, the high intensity flashes of light are emitted in a repeated pattern. When the pattern(s) are repeated 210 continuously over an extended period of time and at a relatively high frequency, the strobe light 308 may have the greatest effect on light sensitive pests, particularly rodents. In one embodiment, given by way of example, the pattern repeats at a rate of about ninety flashes per minute.

In one embodiment, the strobe light 308 is powered on 208 for an extended period of time equaling the lifetime of the strobe tube. The strobe light 308 may be powered continuously for twenty-four hours a day for seven days a week, breaking only to replace the strobe tube. Alternatively, the strobe light 308 may be powered on for a determined period of time representing the amount of time necessary to motivate pests to move nests. The period of time may be subjective to the need for the strobe light 308 and the resources available within the enclosed area 302.

Figure 4:
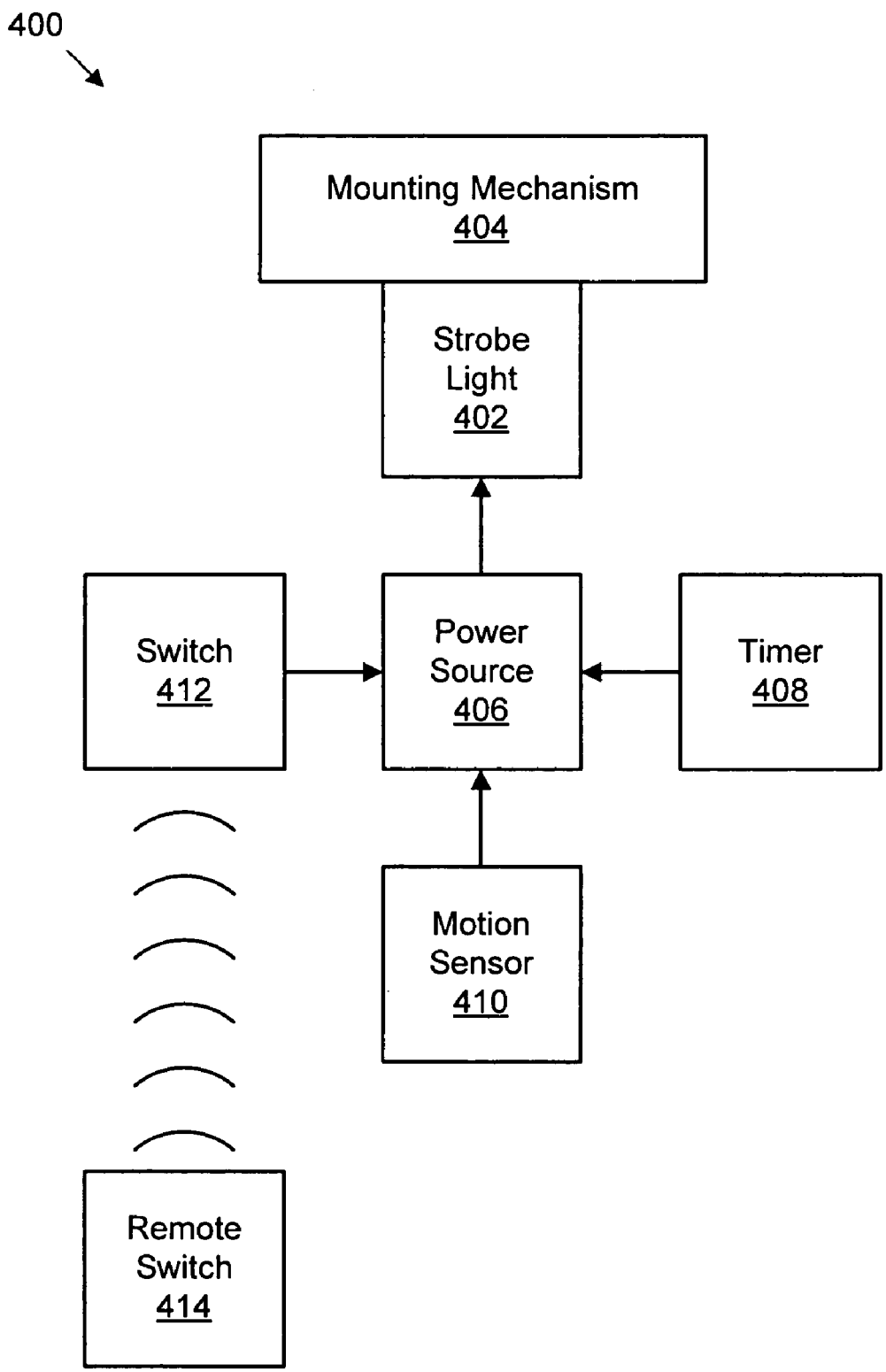
FIG. 4 is a schematic block diagram illustrating one embodiment of a portable pest deterrent device in accordance with the present invention.

FIG. 4 illustrates one embodiment of a portable pest deterrent device 400 in accordance with the present invention. The portable pest deterrent device 400, as depicted, includes a strobe light 402, a mounting mechanism 404, a power source 406, a timer 408, a motion sensor 410, a switch 412, and a remote switch 414. The strobe light 402 may emit high intensity flashes of light in a continuously repeated pattern and at a high frequency.

The mounting mechanism 404 may be connected to the strobe light 402 and may facilitate mounting or placing 104 the strobe light 402 within the enclosed area. In one embodiment, the mounting mechanism 404 enables the strobe light 402 to hang 204 from the support 307 of the enclosed area 302. Alternatively, the mounting mechanism 404 may comprise a stand 312 or the like for positioning the strobe light 402 in a central location relative to the floor 305 or the like of an enclosed area 302 as discussed above. In another embodiment, the mounting mechanism 404 may comprise a chain or the like, which will be discussed in greater detail with relation to FIGS. 5A-5B.

The power source 406 supplies power to the strobe light 402. The power source 406, in one embodiment, comprises a cord configured to plug into a 120 volt AC power outlet. Alternatively, the power source 406 may comprise a battery supply. In certain embodiments, the power source 406 may comprise a combination of 120 volt AC power and a battery supply to power the strobe light 402.

The power source 406 may be regulated 208 to provide efficiency and safety without diminishing the effectiveness of the strobe light 402 to repel pests. In one embodiment, the timer 408 may simply limit the amount of time the power source 406 provides power to the strobe light 402. Alternatively or in addition, the timer 408 may be set to turn the power on and off at intervals. In certain embodiments, the user may adjust the timer 408 depending on the user's need. Additionally, the timer 408 may be used in conjunction with the motion sensor 410 and/or switch 412.

The motion sensor 410 may trigger the power supplied to the strobe light 402. The motion sensor 410 may be an active sensor, such as those that send out beams of light, microwave radio energy or ultrasonic sound waves to detect the presence of an animal or pest. Alternatively, the motion sensor 410 may be a non-transmitting system that detects infrared energy or the like. In one embodiment, the motion sensor 410 may be employed to activate the strobe light 402 when a motion is detected. Alternatively, the motion sensor 410 in conjunction with the timer 408 may deactivate the strobe light 402 if motion is not detected for a determined amount of time.

The switch 412 may enable the user to manually regulate the power supplied to the strobe light 402. In one embodiment, the switch 412 is controlled remotely. The remote switch 414 may include a transmitter to enable the user to power the strobe light 402 on or off from a distance. In certain embodiments, the portable pest deterrent device 400 includes a microcontroller to direct the timer 408, motion sensor 410, switch 412, and/or power source 406. Those of skill in the art will recognize that an assortment of mechanisms may be employed to regulate 208 the power supplied to the strobe light 402.

Figure 5A:
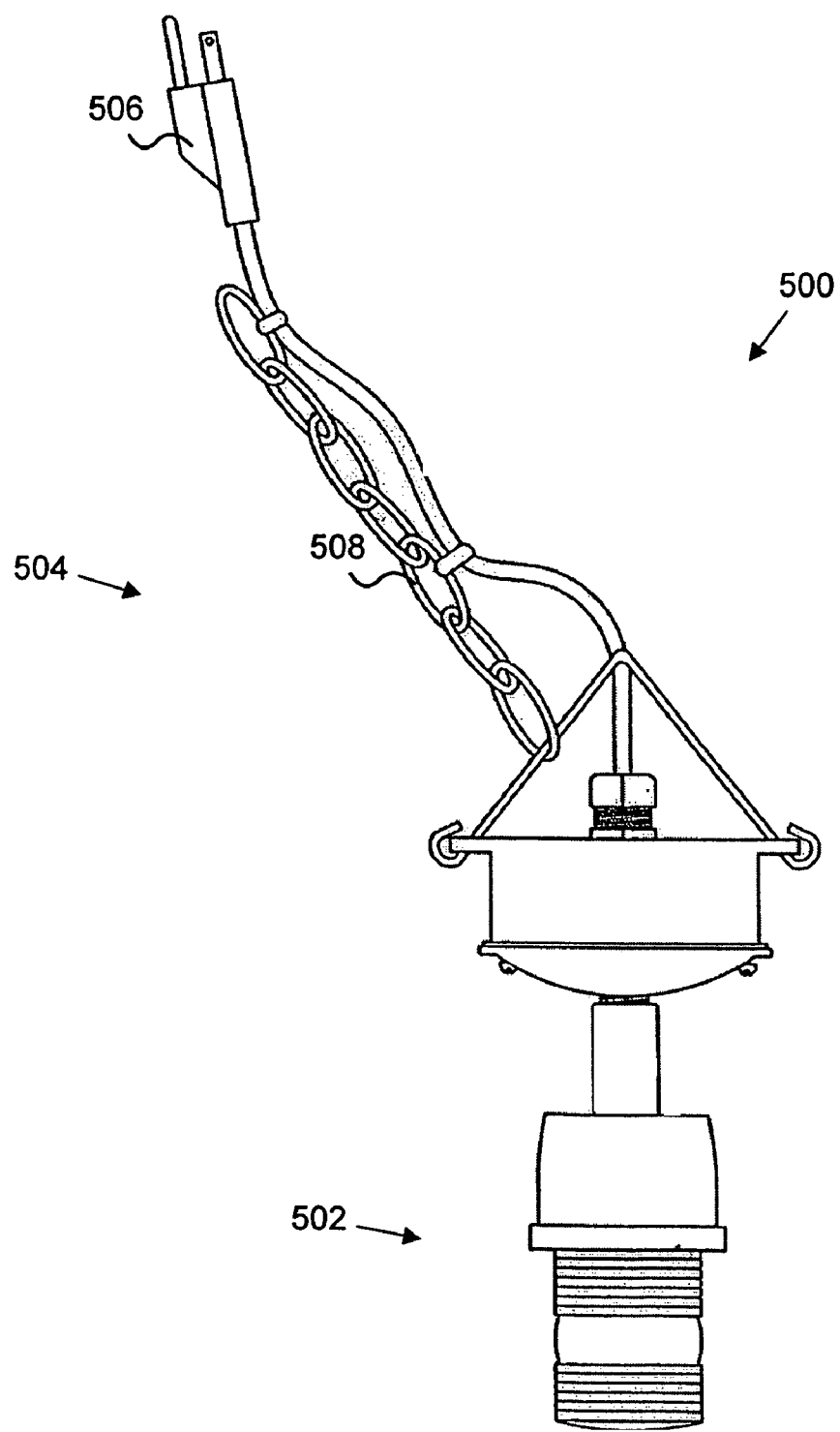
FIG. 5A is a side view illustrating one embodiment of a portable pest deterrent device in accordance with the present invention.
Figure 5B:
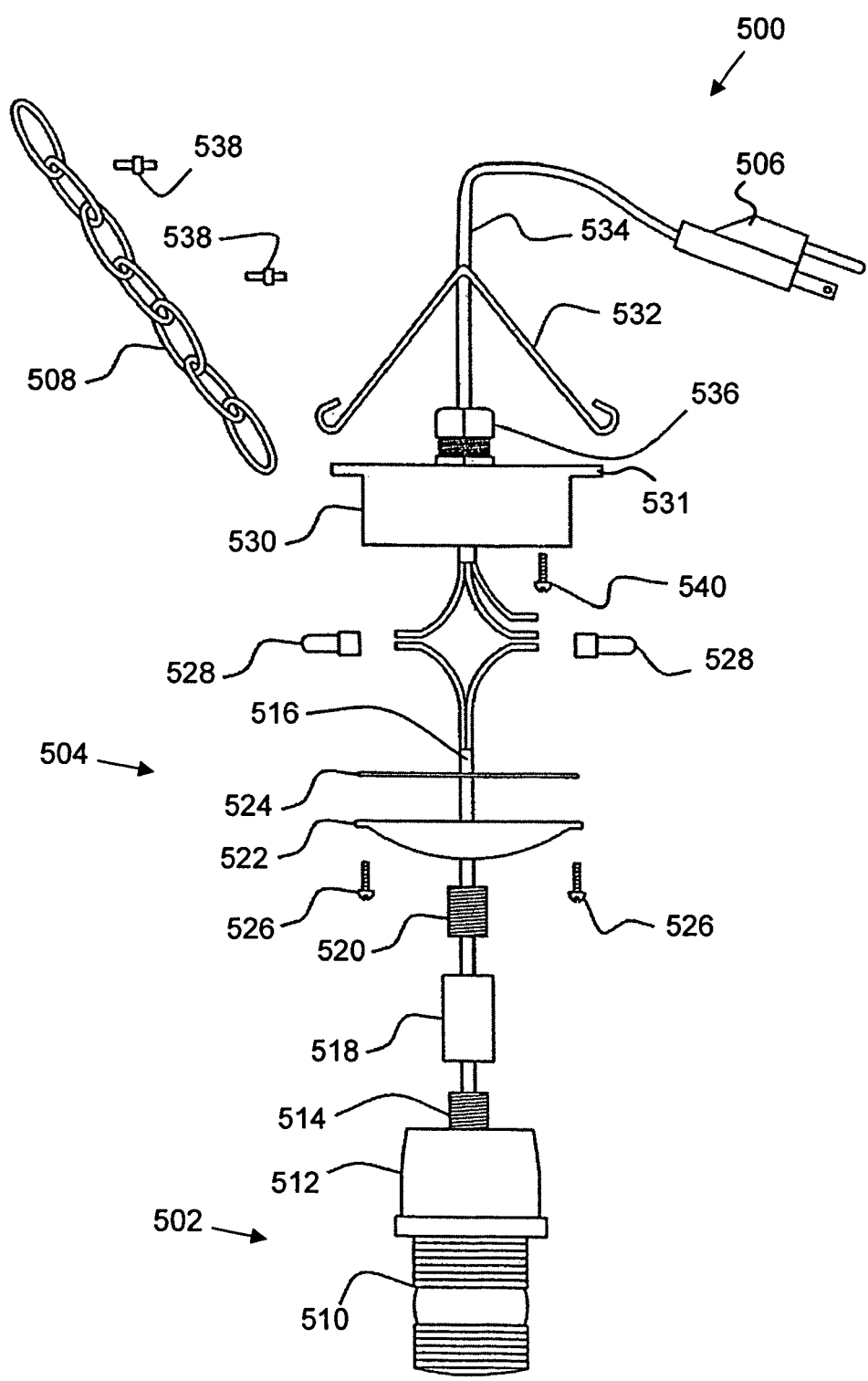
FIG. 5B is an exploded view illustrating in greater detail the portable pest deterrent device illustrated in FIG. 5A.

FIGS. 5A-5B illustrate one embodiment of a portable pest deterrent device 500 in accordance with the present invention. The portable pest deterrent device 500, as depicted in FIG. 5A, includes a strobe light 502, a mounting mechanism 504, and a power source 506. In certain embodiments, the mounting mechanism 504 includes a chain 508, a rope cable, or the like to facilitate hanging 204 the strobe light 502 within the enclosed area. In addition, the strobe light 502 may protrude from the mounting mechanism 504 in order to disperse the high intensity flashes of light throughout the enclosed area.

The portable pest deterrent device 500 may consist of UL (Underwriters Laboratories Incorporated) approved parts and may be suitable for industrial/commercial use. In addition, the portable pest deterrent device 500 may be weatherproof and dustproof.

FIG. 5B illustrates an exploded view of the portable pest deterrent device 500. As depicted, the portable pest deterrent device 500 comprises a lens 510, a lens housing 512, a pipe mount 514, housing wires 516, a threaded coupling 518, a threaded nipple 520, a waterproof cover 522, a waterproof gasket 524, mounting screws 526, insulated wire connectors 528, a waterproof round box 530, a flange 531, a v-shaped galvanized wire 532, a 3-pronged power supply cord 534, a water tight connector 536, tie wraps 538, and a ground screw 540.

The lens 510 and lens housing 512 provide casing for the strobe light 502 and may be connected to the mounting mechanism 504 with the pipe mount 514 and the threaded coupling 518. The threaded nipple 520 may be attached to the round waterproof cover 522 and may be connected to the threaded coupling 518. The waterproof gasket 524 corresponds to the waterproof cover 522 and may include holes for receiving the mounting screws 526. The housing wires 516 may be fed through the waterproof gasket 524, the waterproof cover 522, the threaded nipple 520, and the threaded coupling 518.

In one embodiment, a twelve-foot long 3-pronged power supply cord 534 is threaded through the watertight connector 536 and maybe connected to the waterproof round box 530 with the ground screw 540. In the depicted embodiment, two wires of the 3-pronged power supply cord 534 are connected to the housing wires 516 by crimping the wires with nylon insulated wire connectors 528. The third wire of the 3-pronged power supply cord 534 may be fastened to the waterproof round box 530 with the ground screw 540.

The waterproof cover 522 and the waterproof gasket 524 maybe connected to the waterproof round box 530 with the mounting screws 526. The v-shaped galvanized wire 532 may be fastened to the waterproof round box 530 through holes in the flanges 531. The 3-pronged power supply cord 534 maybe threaded through the v-shaped galvanized wire 532 and fastened to the coated chain 508 with tie wraps 538.

The strobe light 502 may be a high intensity beacon that provides a 360 degree range of consistent, high intensity flashes of light. The strobe light 502 may or may not be triggered by other mechanisms. In certain embodiments, the portable pest deterrent device 500 is powered by 120 and 240 AC volts. In one embodiment, the strobe light 502 is powered continuously for maximum protection against pests.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for vacating rodents and insects from an enclosed area, the method comprising:

identifying an enclosed area inhabited by at least one of rodents and insects;

substantially eliminating extraneous sources of light from the enclosed area by blocking any windows or other inlets or sources of light in the enclosed area;

providing a strobe light configured to emit high intensity flashes of light in a range equal to or greater than 100,000 candlepower in a continuously repeated pattern for the purpose of repelling the at least one of rodents and insects, a mounting mechanism configured to mount the strobe light in the enclosed area, and a power source configured to supply energy to the strobe light;

placing the strobe light in the enclosed area in a relatively central location;

providing power to the strobe light;

emitting from the strobe light the high intensity flashes of light in a 360 degree range throughout the enclosed area; and repelling the at least one of rodents and insects from the enclosed area by the operations of providing, placing, and emitting.

2. The method of claim 1, wherein placing the strobe light further comprises hanging the strobe light from a support of the enclosed area.

3. The method of claim 1, wherein the method further comprises dispersing the high intensity flashes of light throughout the enclosed area.

4. The method of claim 1, wherein the method further comprises continuously repeating the pattern at a relatively high frequency.

5. The method of claim 1, wherein the method further comprises regulating the power supplied to the strobe light.

6. The method of claim 5, wherein the power supplied to the strobe light is controlled remotely.

7. The method of claim 1, wherein the method further comprises using a timer to monitor the power supplied to the strobe light.

8. The method of claim 1, wherein the method further comprises using a motion sensor to trigger the power supplied to the strobe light.

* * * * *